United States Patent
Hayosh

(10) Patent No.: US 6,464,147 B1
(45) Date of Patent: Oct. 15, 2002

(54) DUAL GAP READ HEAD FOR MAGNETIC INK CHARACTER RECOGNITION

(75) Inventor: Thomas D. Hayosh, Bloomfield Hills, MI (US)

(73) Assignee: Unisys Corporation, Blue Bell, PA (US)

( * ) Notice: Subject to any disclaimer, the term of this patent is extended or adjusted under 35 U.S.C. 154(b) by 111 days.

(21) Appl. No.: 09/693,343

(22) Filed: Oct. 20, 2000

(51) Int. Cl.[7] .............................................. G06K 19/06
(52) U.S. Cl. ...................................... 235/493; 235/449
(58) Field of Search ................................. 235/449, 380, 235/375, 379, 383, 493; 360/2, 119, 124; 209/534, 567, 540, 570, 569

(56) References Cited

U.S. PATENT DOCUMENTS

| | | | |
|---|---|---|---|
| 4,058,706 A | * 11/1977 | Kao et al. ..................... 235/449 |
| 4,080,528 A | * 3/1978 | Kao et al. ..................... 235/449 |
| 4,097,910 A | * 6/1978 | Lafevers et al. ............. 360/124 |
| 4,143,355 A | 3/1979 | MacIntyre .................... 382/139 |
| 4,143,356 A | 3/1979 | Nally ........................... 382/139 |
| 5,091,961 A | 2/1992 | Baus ............................ 382/139 |
| 5,121,437 A | 6/1992 | Mazumder |
| 5,134,663 A | 7/1992 | Kozlowski ..................... 382/7 |
| 5,649,628 A | * 7/1997 | Stevens et al. ............. 209/534 |
| 5,667,924 A | * 9/1997 | Ziolo ........................... 430/39 |
| 5,712,564 A | * 1/1998 | Hayosh ....................... 324/210 |
| 5,736,722 A | 4/1998 | Chamberlain, IV ......... 235/449 |
| 6,259,808 B1 | * 7/2001 | Martinez et al. ............ 382/139 |

* cited by examiner

*Primary Examiner*—Thien M. Le
(74) *Attorney, Agent, or Firm*—Lise A. Rode; Michael B. Atlass; Mark T. Starr

(57) ABSTRACT

A magnetic read head assembly and method for recognizing magnetic ink characters involves the scaling of peak information based on a second waveform. The read head assembly includes a first read head for generating a first waveform in response to a magnetic field of a magnetic ink character printed on a document. A second read head generates a second waveform in response to the magnetic field of the magnetic ink character. The read heads have a known head spacing, where the known head spacing defines an actual distance between the first read head and the second read head. In operation, peak information is determined for the character based on the first waveform. The peak information is scaled based on the first waveform and the second waveform. The scaled peak information is then compared to peak profiles, where the profiles correspond to known magnetic ink characters. Scaling the peak information based on the second waveform eliminates the need for precise knowledge or control of the document velocity.

23 Claims, 13 Drawing Sheets

30
Character One
Character Two
Character Three
Character Four
Character Five
Character Six
Character Seven
Character Eight
Character Nine
Character Zero
Symbol R-T
Symbol Amount
Symbol On-Us
Symbol Dash
FIG 1

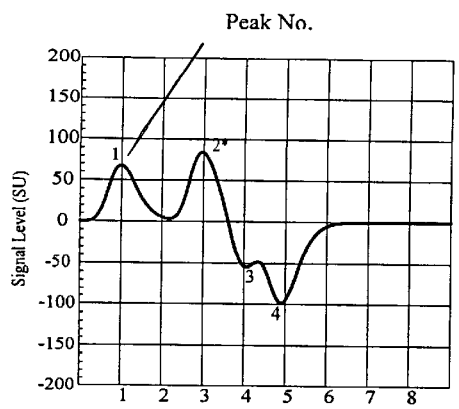
Character 1
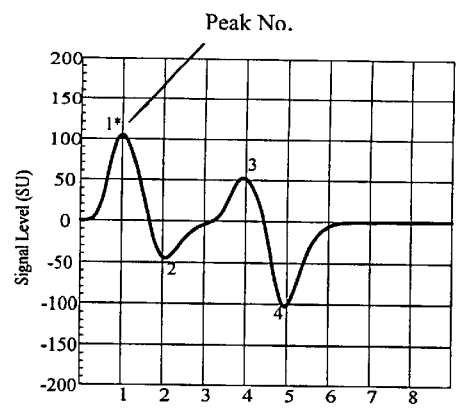
Character 2
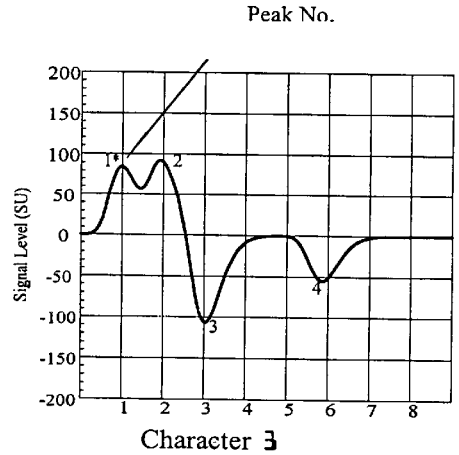
Character 3
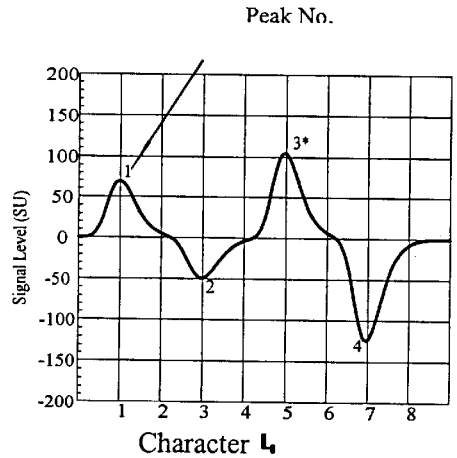
Character 4
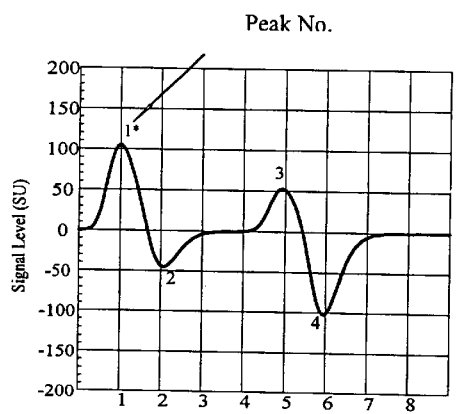
Character 5
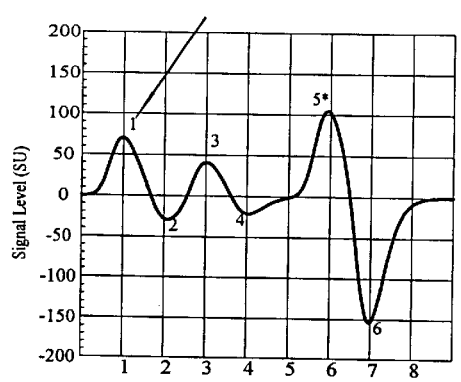
Character 6
FIG 2a

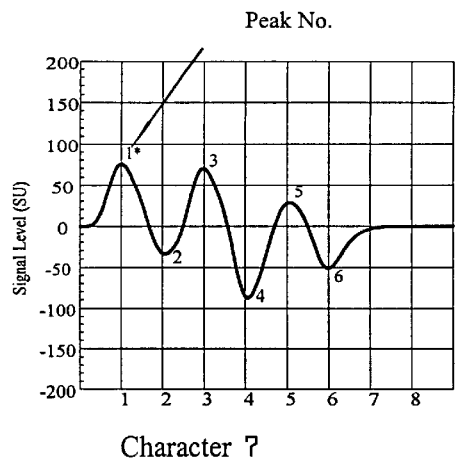
Character 7
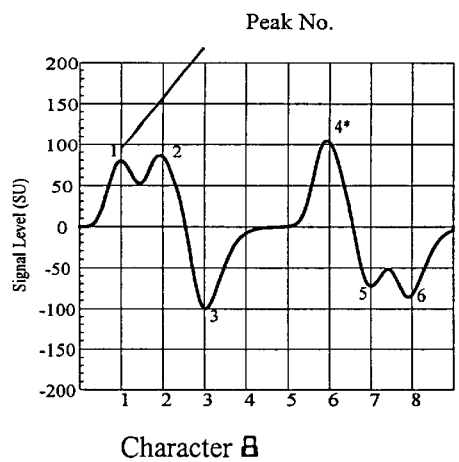
Character 8
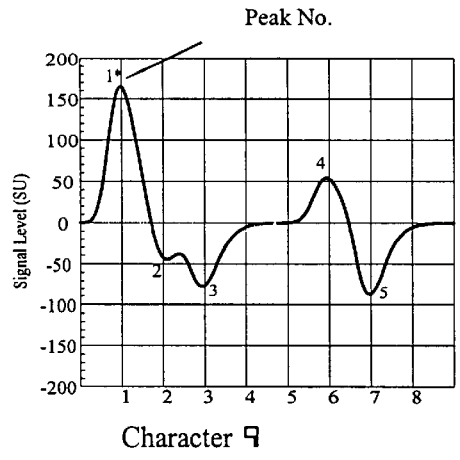
Character 9
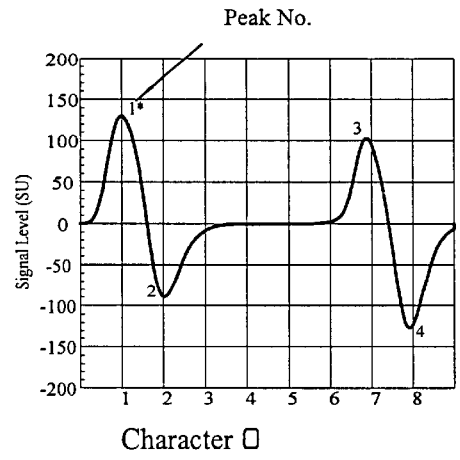
Character 0
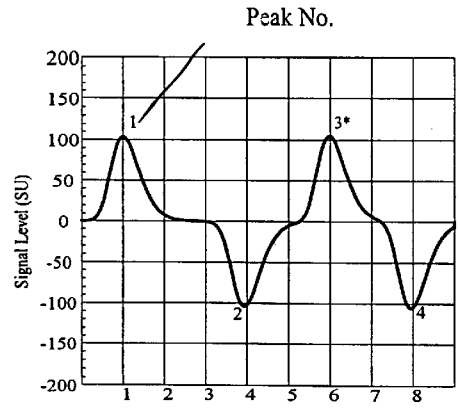
Character :
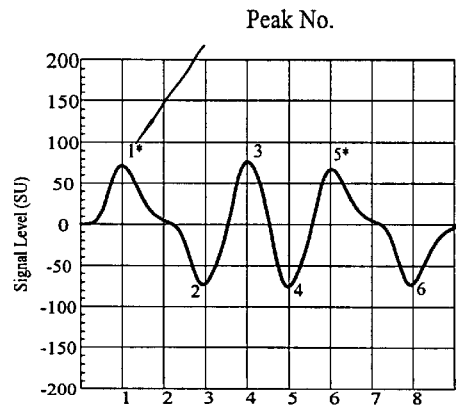
Character "
FIG 2b

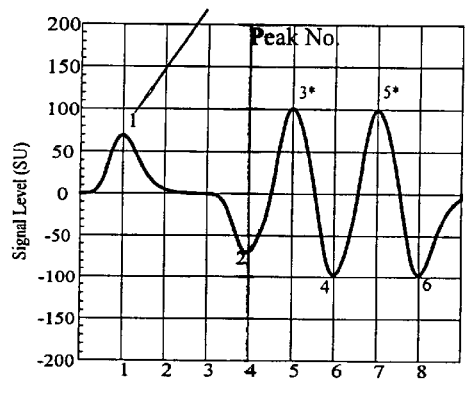
Character "
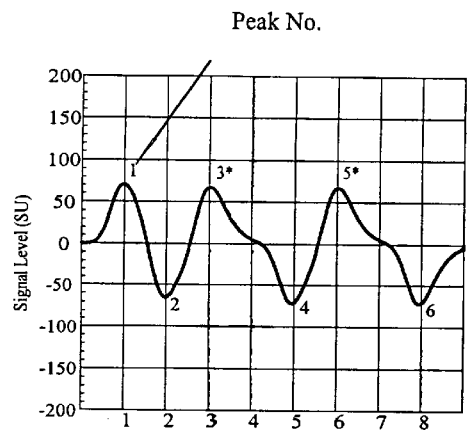
Character '''
FIG 2c

FIG 5 Waveform for a MICR Character ▢

Note: All dimensions in inches

DUAL GAP READ HEAD FOR MAGNETIC INK CHARACTER RECOGNITION

FIELD OF THE INVENTION

The present invention generally relates to magnetic ink character recognition. More particularly, the invention relates to a read head assembly and method for recognizing magnetic ink characters that involves the dimensional scaling of MICR peak information of a first waveform based on a second waveform. MICR peak information includes information regarding the relative amplitude of each peak and the relative position of each peak.

BACKGROUND ART

Banks, credit unions and other financial institutions regularly process checks, deposit slips, and other types of bank documents in order to execute financial transactions efficiently. Document processing systems have therefore become quite prevalent in the industry. Typically, information will be printed on these documents in magnetic ink that can be read both by the human eye and a computer. This form of printing is read by a process termed "magnetic ink character recognition" (MICR). As part of the recognition process, a MICR magnetic read head is used to read the information printed on the document. The American National Standards Institute with the American Bankers Association as Secretariat has promulgated print and test specifications for this magnetic ink printing.

Conventional approaches to MICR generally involve the step of determining peak information for a waveform generated by the magnetic read head. This peak information typically includes information regarding the amount of time between the peaks of each character. Knowledge of the velocity of the document (and thus, the character contained therein) allows this time information to be converted into distance information, which can be compared to each MICR character and their peak profiles as contained in the ANS X9.27-2000 "Print and Test Specifications for Magnetic Ink Printing (MICR)" as promulgated by the American National Standards Institute.

The above approach is acceptable if the velocity of the document is either known or can be controlled. In fact, conventional approaches to MICR typically involve rather complex schemes for controlling the velocity of the document or attempting to measure its velocity at different times as the document moves past the MICR read head. It is easy to understand that these schemes have a tendency to increase design, processing, and manufacturing costs. It is therefore desirable to provide a system and method for recognizing a magnetic ink character printed on a document that does not require knowledge or control of document velocity.

SUMMARY OF THE INVENTION

In a first aspect of the invention, a method for recognizing a magnetic ink character printed on a document is provided. The method includes the step of determining peak position information for a MICR character based on a first waveform, where the first waveform is generated in response to a magnetic field of the character. The method further provides for dimensionally scaling the peak information in the x dimension based on the first waveform and a second waveform, wherein the second waveform is also generated in response to the magnetic field of a MICR character. The dimensionally scaled peak position information with its relative amplitude is then compared to peak position and amplitude profiles, where the peak profiles correspond to known magnetic ink characters. Dimensionally scaling the peak position information based on a second waveform eliminates the need for precise knowledge or control of the document velocity.

In a second aspect of the invention, a method for dimensionally scaling peak position information based on a scaling waveform, where the scaling waveform is generated by a dimensionally scaling read head, is provided. The method includes the step of determining a known head to head spacing, where the known head to head spacing defines a distance between a measurement read head and the scaling read head. The measurement read head generates a measurement waveform in response to the magnetic field of the magnetic ink character. A measured head to scaling head spacing is then determined based on the measurement waveform and the scaling waveform. The method further provides for dimensionally scaled peak position information to be calculated based on the spacing between the known head and the measured head.

In another aspect of the invention, a read head assembly for a magnetic ink character recognition system is provided. The read head assembly includes a first read head for generating a first waveform in response to a magnetic field of a magnetic ink character printed on a document. A second read head generates a second waveform in response to the magnetic field of the magnetic ink character. The read heads have a known head to head spacing, where the known head to head spacing defines an actual distance between the first read head and the second read head.

BRIEF DESCRIPTION OF THE DRAWINGS

The invention is set forth in exemplary fashion by the following detailed description of a preferred embodiment taken in conjunction with the drawings, in which:

FIG. 1 shows the outline and shape of the 14 characters and symbols, which are called the E-13B MICR character set, as used on many financial payment documents;

FIGS. 2a through 2c show the set of waveforms for each E-13B character and symbol as read from a responsive magnetic single gap read head when the magnetized characters are passed by the magnetic read head from left to right;

DETAILED DESCRIPTION OF THE PREFERRED EMBODIMENTS

FIG. 1 is the E-13B character set 30 containing 10 characters and 4 symbols as defined in the American National Standard X9.27-2000 Print and Test Specifications for Magnetic Ink Printing (MICR), as promulgated by the American Bankers Association. When used on a document for automated machine reading, the characters and symbols in set 30 must be printed using magnetic ink. ANS X9.27 defines the dimensions of each character/symbol and the expected nominal waveform peak position and relative amplitude of waveform peaks.

FIGS. 2a, 2b and 2c demonstrate the waveform detail of each of the characters/symbols shown in FIG. 1 when each character/symbol is moved past a single gap magnetic read head at some given constant velocity. The characters are first magnetized with the magnetic North pole on the right of each character with its magnetic vector lying within the plane of the paper prior to reaching the magnetic read head from left to right. Each horizontal grid line on the graphs represents 0.013 inches. The first left hand character peak is aligned with the first position (or vertical) grid line so that it can be seen that many of the peaks are aligned on these dimensional matrix boundaries since the MICR characters/symbols are designed using increments of 0.013 inch in the horizontal direction. Normally, in order to produce waveforms where the peaks correspond to a known dimension, the velocity of the characters must be precisely set, otherwise, the character peaks will not correspond to an overlaid dimensional grid as illustrated in FIG. 2. For example, if the velocity of the character moving past the read head is 100 inches/second, the time for 0.013 inch (one grid space) is 130 microseconds. If however, the velocity suddenly changes to 110 inches per second, then the peak positions would be displaced to the left, with the right-most peaks being displaced the most-considering that the overlaid grid was not changed in correspondence with the change in velocity.

Figure 3:
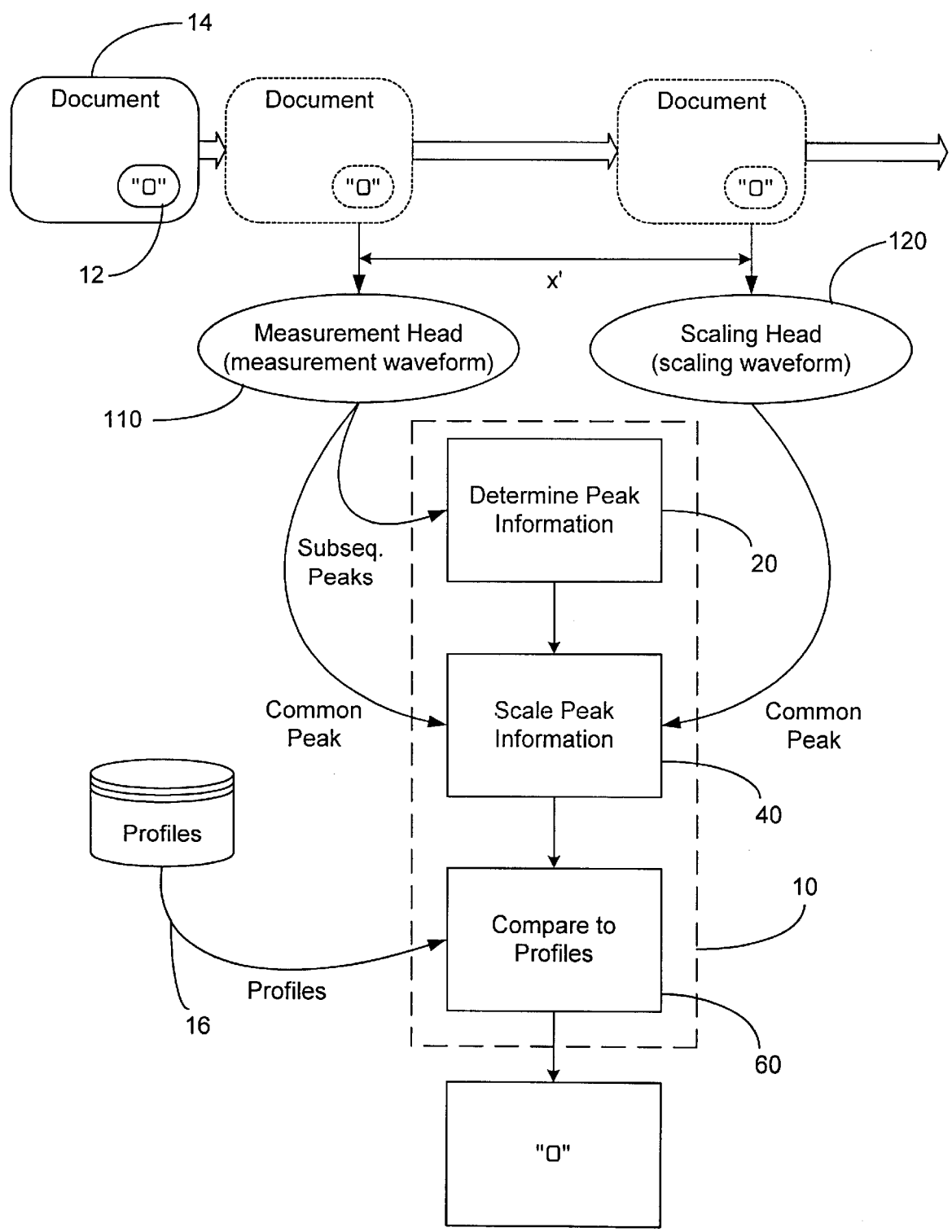
FIG. 3 is a block diagram demonstrating a method for recognizing a magnetic ink character printed on a document in accordance with the principles of the invention.
Figure 5:
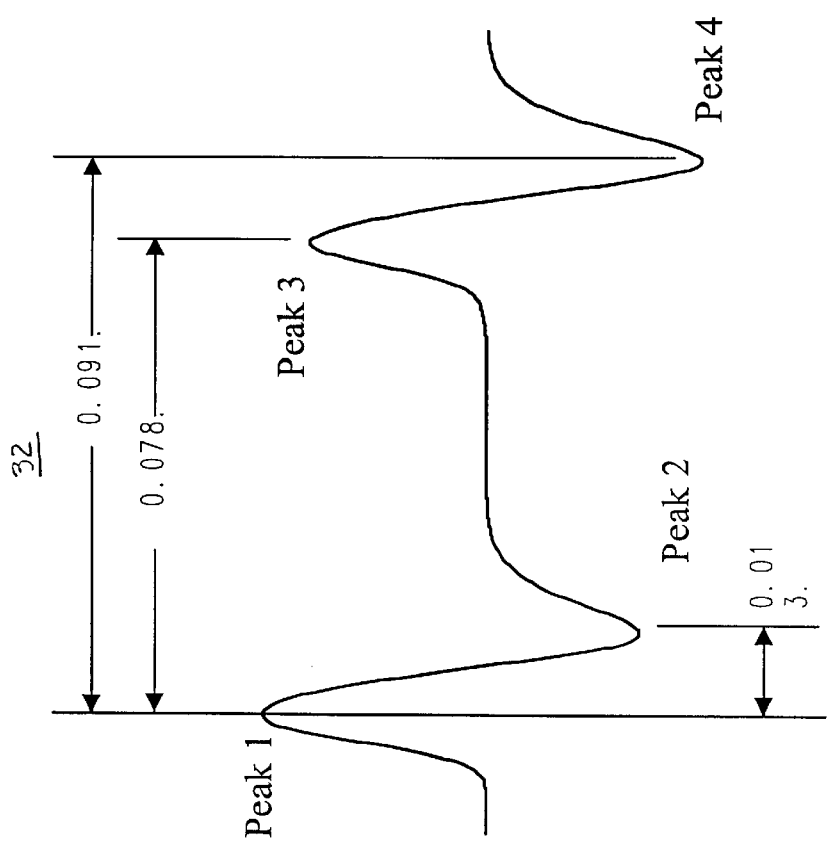
FIG. 5 is a waveform with peak information for a MICR character "zero" that contains character profile data for peak relative amplitude and dimensional peak position.

Turning now to FIG. 3, a method 10 for recognizing a magnetic ink character 12 printed on a document 14 is shown. While the character 12 is shown to be the number zero, it will be appreciated that this is for discussion purposes only. Thus, all standard MICR characters, whether they are of the font and style E-13B or CMC-7, can be recognized with the method 10. It is also important to note that while the method 10 will be described with regard to a single character 12, the present invention can be readily applied to strings of characters of any length without parting from the spirit and scope of the invention. With continuing reference to FIG. 3, it can be seen that at step 20, peak position information is determined for the character 12 based on all subsequent peaks of a first waveform (or measurement waveform). The first waveform is generated in response to a magnetic field of the character 12. The peak information is scaled at step 40 based on a common peak of the first waveform and a second waveform (or scaling waveform). The second waveform also is generated in response to the magnetic field of the character 12. At step 60, the scaled peak position and amplitude information is compared to peak position and amplitude profiles 16, where the profiles 16 correspond to known magnetic ink characters. A typical profile for the MICR character "□" is shown in FIG. 5 at 32. It is well known that these profiles may be obtained from the ANS X9.27-2000 Print and Test Specifications for Magnetic Ink Printing (MICR) as promulgated by the American National Standards Institute or other sources and stored in any type of medium such as digital RAM. The use of the second waveform to scale the peak position information allows the recognition to take place without precise knowledge or control of the document velocity.

Figure 4:
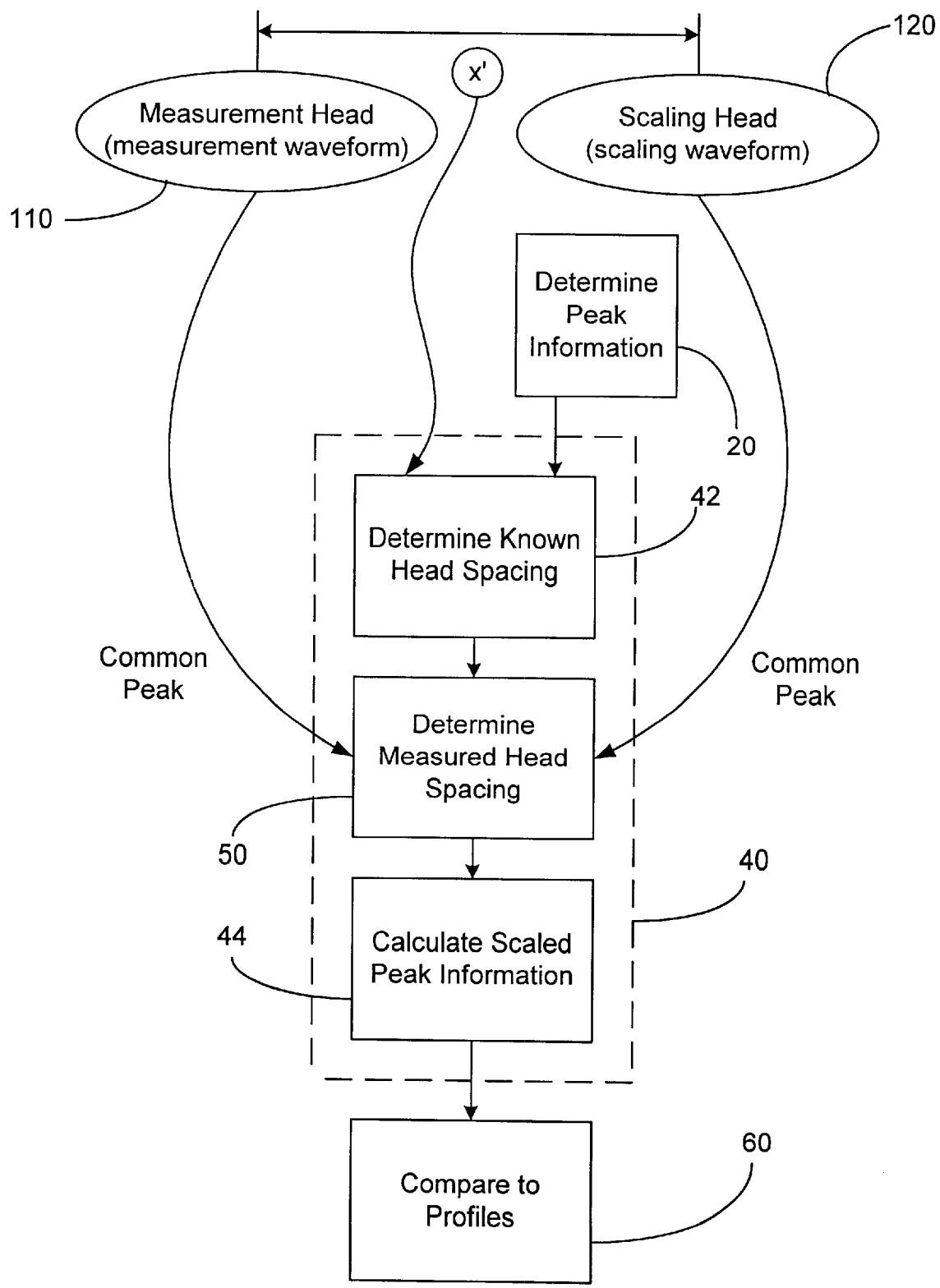
FIG. 4 is a block diagram demonstrating a method for dimensionally scaling peak information in accordance with the principles of the invention.
Figure 6:
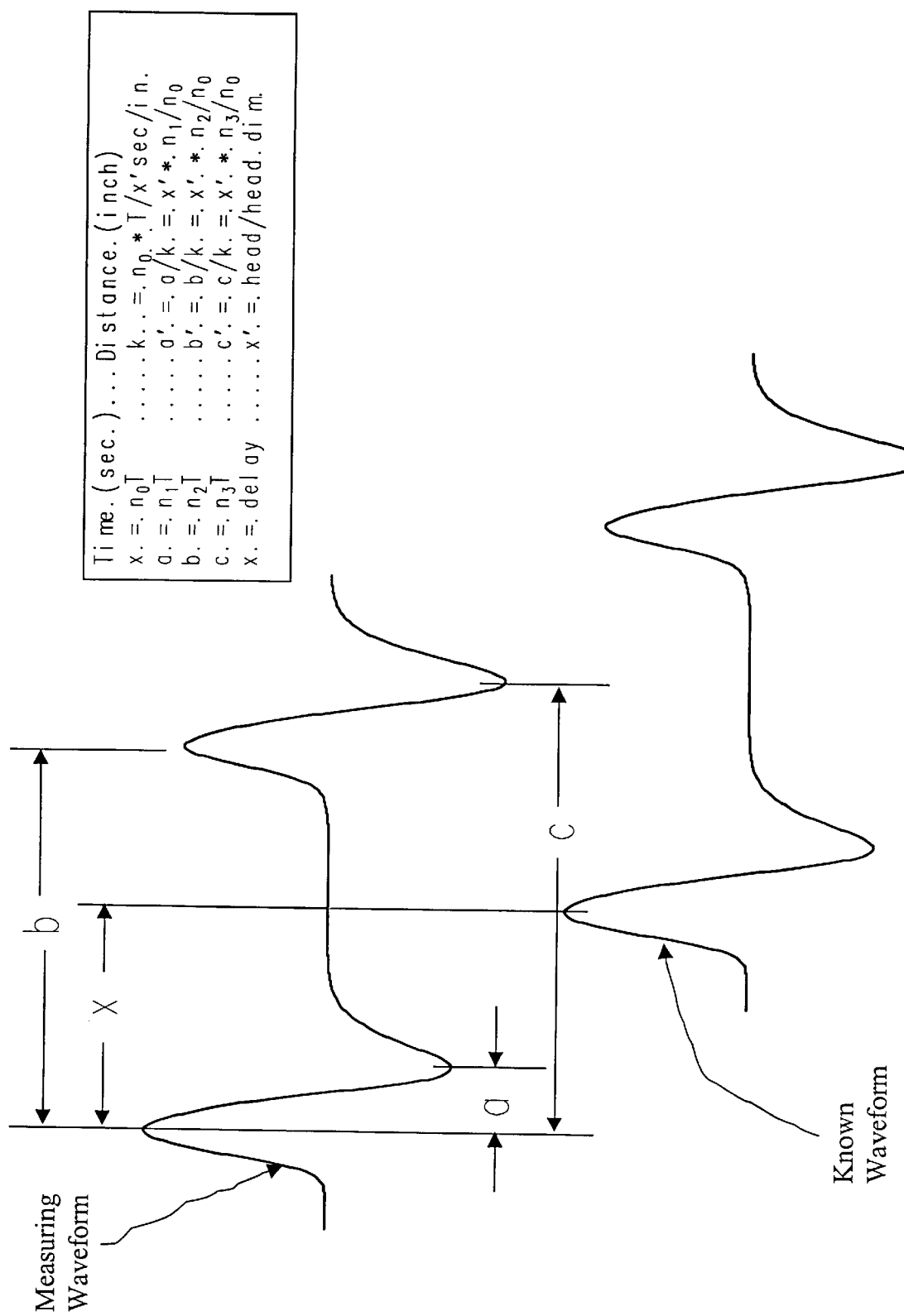
FIG. 6 is an illustration of a first waveform (measuring waveform) for a MICR character zero, □, and a second waveform (known waveform) that is delayed from the first waveform.

FIG. 4 demonstrates a preferred approach to scaling the peak position information at step 40. Specifically, it can be seen that at step 42, a known head spacing is determined using a calibration document producing known peak positions in the first waveform as well as a common peak in both the first and second waveform, where the known head spacing defines an actual distance between a first read head 110 and a second read head 120. It will be appreciated that the first waveform is generated by the first read head 110, and the second waveform is generated by the second read head 120. Thus a calibration document would use a single character such as a "□" that has been optically measured and the dimensions recorded. In FIG. 6, peak-to-peak dimensions and a dimension representing the delay from the second to the first waveform are shown. Assume that after inserting the calibration document into the reader transport, the time measurements for x and c are observed and recorded as well as sample counts for $n_0$ and $n_3$ taken. Dimension c' is a known value taken from the optical measurement of the actual character from the calibration document thus allowing the calculation of $x'=c'* n_0/n_3$. With x' being available, then the conversion of time measurements to dimension units can be calculated. The known head spacing need only be measured once when the system is assembled and the value x' can be stored in ROM or similar storage for use in determining the scaling factor k such that when a time measurement is made and divided by k, the conversion measurement is now in dimension units. For any system, $k=n_0 * T/x'$ seconds/inch. For example, a time measurement c divided by k produces a dimension c'. The scaling factor k is calculated at least one time at the occurrence of the first common character peak. It may be calculated multiple times up to the total number of peaks observed in order to account for a wide variation in document travel velocity.

Returning now to FIG. 4, at step 50, a measured head spacing is determined based on a common peak in the first waveform and the second waveform. At step 44 the scaled peak position information is calculated based on the known head spacing and the measured head spacing. It will be appreciated that the common peak between the first and second waveform can be selected based on any number of factors. For example, the number zero shown in FIG. 3 and FIG. 5 has four peaks (two positive and two negative) that can all be selected, separately or in any combination, as the common peak. Peaks are detected and determined using signal strength and change of slope techniques well known in the art.

From FIG. 6 it can be seen that measurement of dimensions of peaks on the measuring waveform may take the form of providing a sample period T and counting the number of samples, n, that occur between two events such as between two specific peaks. The selection of the sample period is determined by the minimum accuracy desired in measurement. For instance, we may wish to measure to an accuracy of 0.001 inch so that the sample period would be chosen accordingly. In the example where the document has an approximate velocity of 100 inches per second, T=0.001/100=10 microseconds. Measurement of dimensions from the measuring waveform using the counting of samples may provide direct scaling based on the known head to head dimension, x', between the measuring read head and the scaling read head. The basic equations are shown on FIG. 6. The number of samples, $n_0$, $n_1$, $n_2$, and $n_3$ are used to directly calculate the dimensions a', b', and c'. The units of measurement of x, a, b, and c are time, whereas the units of measurement of a', b', c' are inches.

Figure 7:
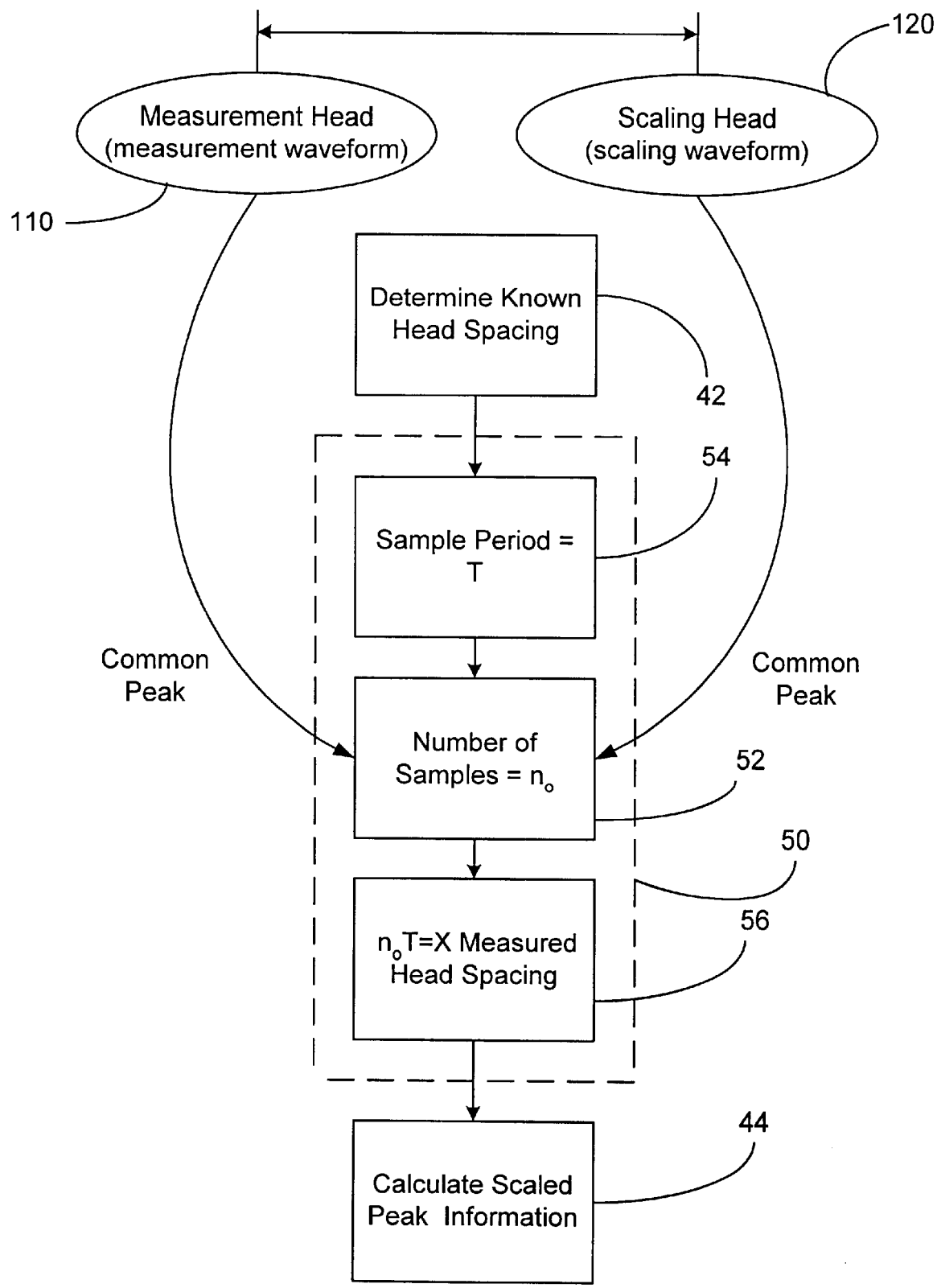
FIG. 7 is a block diagram demonstrating a process for determining a measured head spacing in accordance with the principles of the invention.

Turning now to FIG. 7, a preferred approach to determining the measured head spacing is shown at step 50. Specifically, it can be seen that at step 52, a number of samples between a common peak of the first waveform and the second waveform is determined. This can be done by simply counting the number of clock pulses $n_{00}$ between the detection of the common peak. At step 54, a sample period "T" for the samples is determined based upon the resolution of sampling being nominally equivalent to approximately 1 sample per 0.001 inch or less of document travel. Thus, at step 56, the number of samples $n_0$ between the common peaks is multiplied by the sample period T to determine the measuring head spacing. The resulting measured head spacing is therefore effectively a measure of time. It will be appreciated that if the waveforms were printed out at a uniform velocity, the measured head spacing could be determined in units of distance by manually measuring between the common peak of the two waveforms. Nevertheless, a determination of measured head spacing is made at step 50. It will further be appreciated that the step 54 of determining the sample period can be based on a desired recognition resolution. The value of T is therefore a selectable design parameter.

Figure 8:
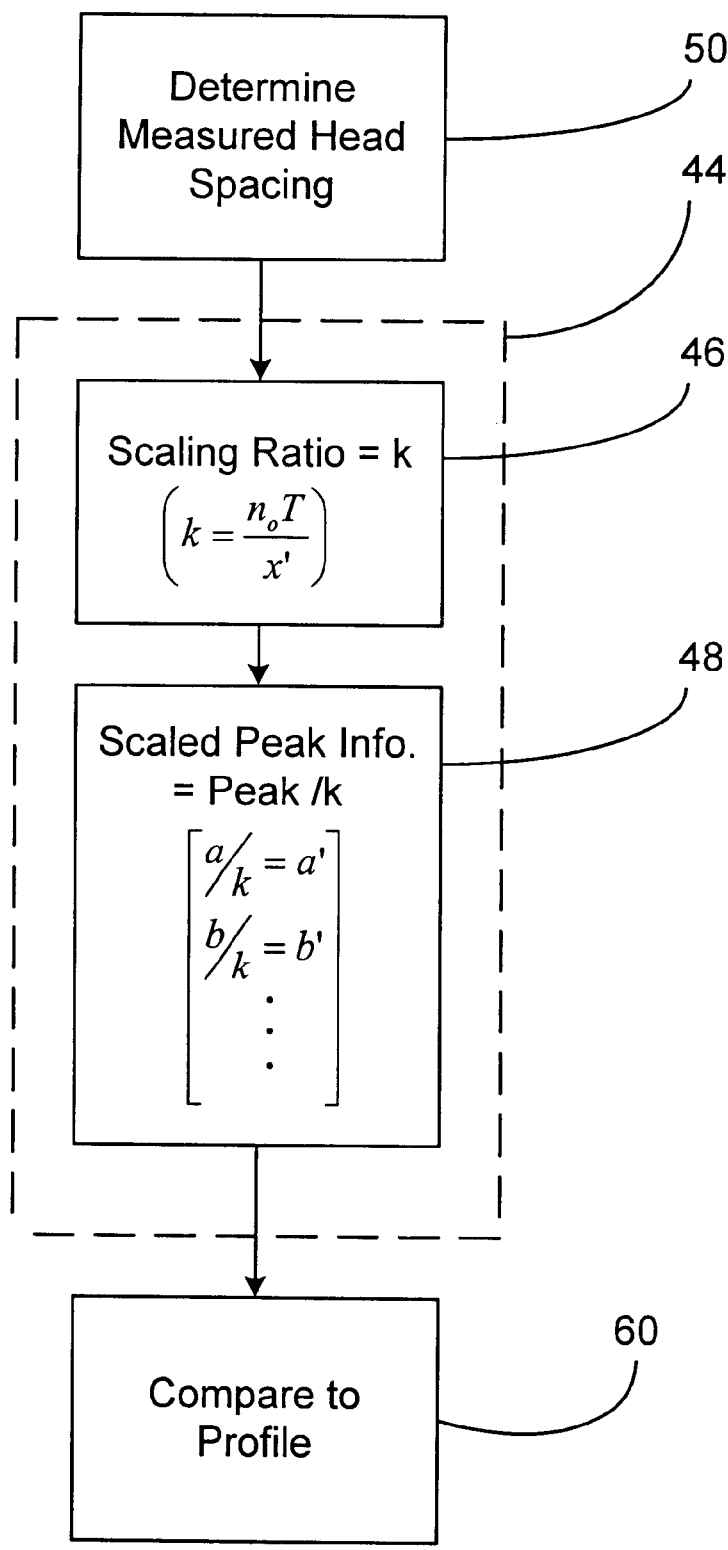
FIG. 8 is a flowchart of a process for calculating dimensionally scaled peak position information in accordance with the principles of the invention.
Figure 9:
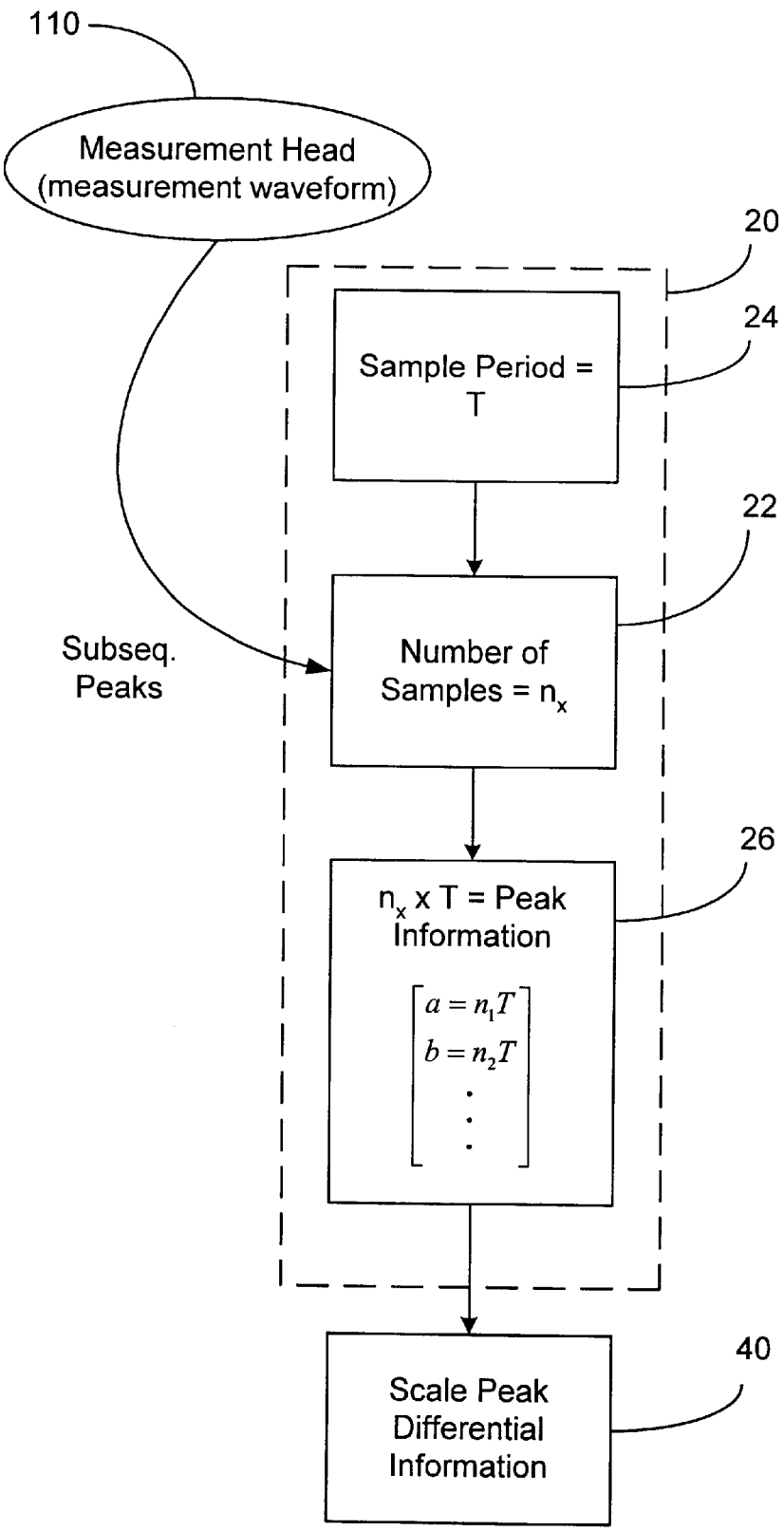
FIG. 9 is a block diagram demonstrating a process for determining peak position information in accordance with the principles of the invention.

FIG. 8 is a flowchart showing one approach to the process of calculating scaled peak position information at step 44. It can be seen that at step 46 a scaling factor "k" is determined based on the measured head spacing n and the known head spacing x'. This can be done by simply dividing the measured head spacing x=$n_0$T by the known head spacing x'. At step 48 the peak information is divided by the scaling factor "k" to obtain the scaled peak information. Turning now to FIG. 9, one approach to determining peak differential information is shown at step 20. It will be appreciated that the preferred approach to step 20 is very similar to that of step 50 (FIG. 7) for determining a measured head spacing. The major difference is that step 20 makes use of subsequent peaks of the first waveform, whereas step 50 makes use of a common peak between the first waveform and the second waveform. Nevertheless, it can be seen that at step 22 a number of samples $n_x$ between peaks of the first waveform is determined. A sample period T for the samples is determined at step 24. It should be noted that this step is identical to step 54 shown in FIG. 7 and is subject to the same design considerations. At step 26 the number of samples $n_x$ between peaks is multiplied by the sample period T to obtain the peak differential information.

Figure 10:
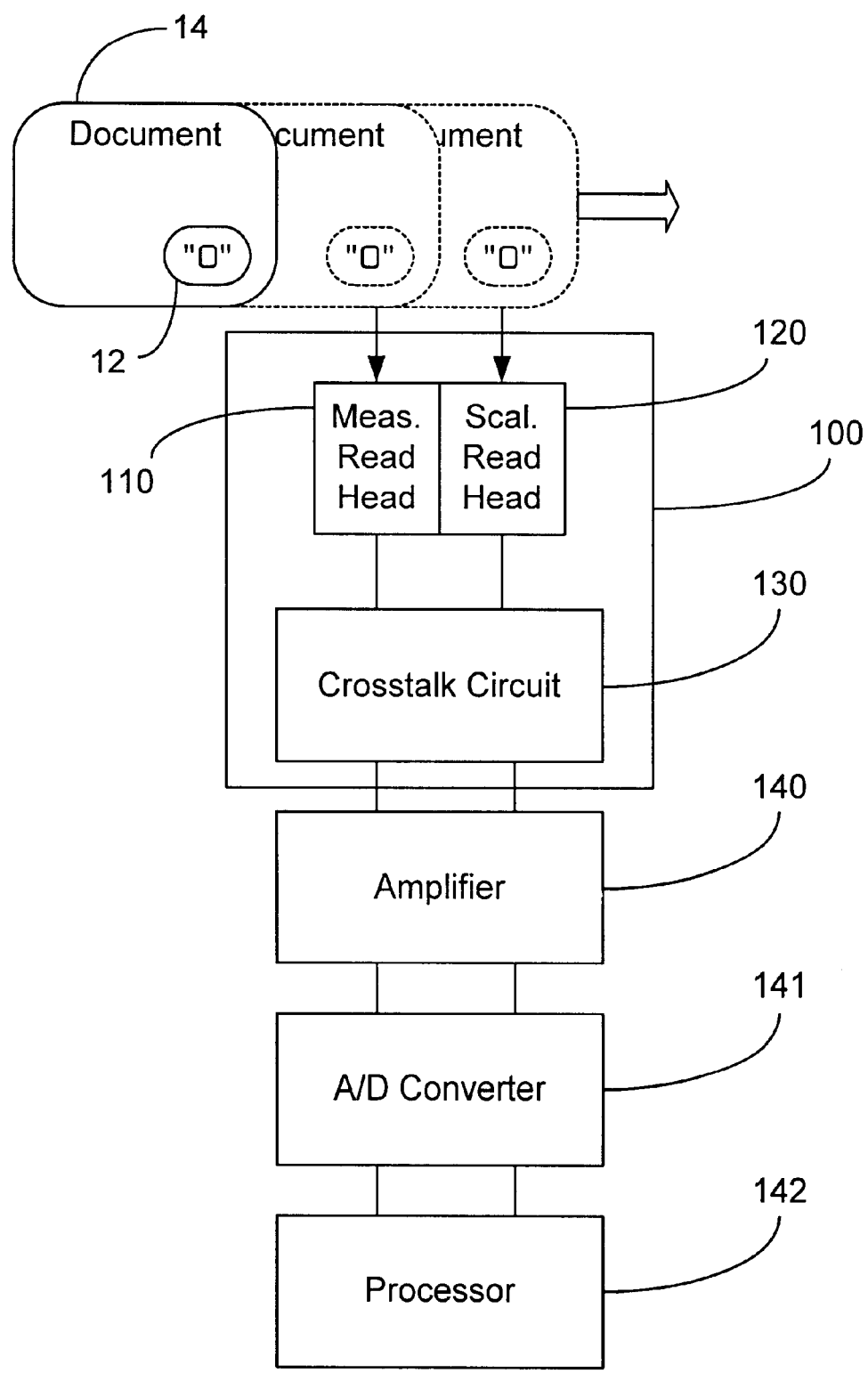
FIG. 10 is a block diagram of a magnetic ink character recognition system in accordance with the principles of the invention.

FIG. 10 shows a read head assembly 100 in accordance with the present invention. Specifically, the assembly 100 has a first read head 110 for generating a first waveform in response to a magnetic field of the character 12 printed on the document 14. A second read head 120 generates a second waveform in response to the magnetic field of the character 12. As will be described in greater detail below, the read heads 110, 120 have a known head spacing, where the known head spacing defines an actual distance between the first read head 110 and the second read head 120. It is important to note that "crosstalk" will occur between the read heads 110, 120 due to their magnetic nature and close proximity causing flux linkages between the first read head and the second read head. It is therefore preferable to provide a crosstalk elimination circuit 130 for reducing crosstalk between the first waveform and the second waveform. The result is then passed on to an amplifier 140 with two independent channels providing the bandpass shaping as defined in ANS X9.27, a dual A/D converter 141 for converting the analog signals into 2 multi-bit digital channels, and a processor 142 for execution of the above-described methods and corresponding steps. It will be appreciated that the processor 142 can be implemented via any device capable of reading and executing software code.

Figure 11:
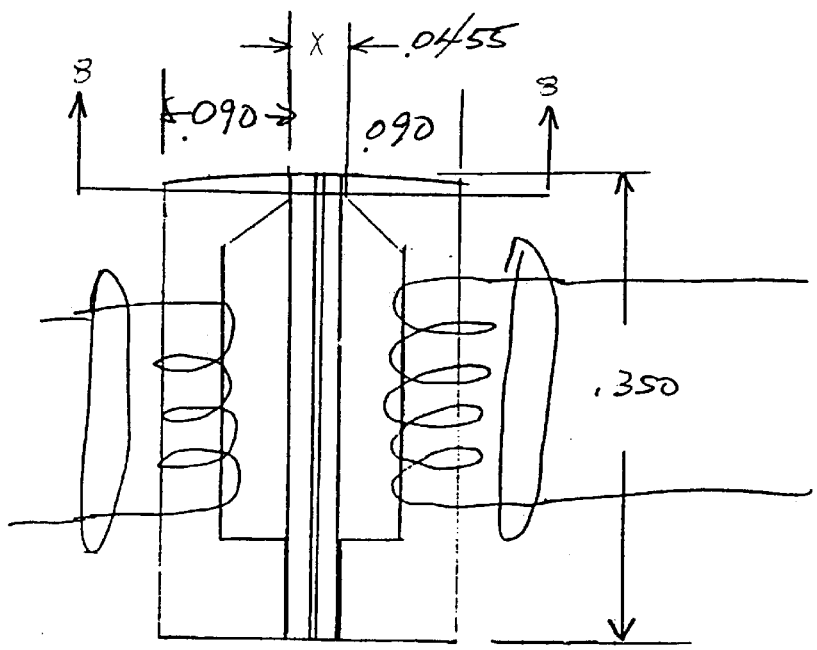
FIG. 11 is a side view of a plurality of read heads in accordance with the principles of the invention; and, FIG. 12 is a cross-sectional view taken along lines 8—8 in FIG. 11.
Figure 12:
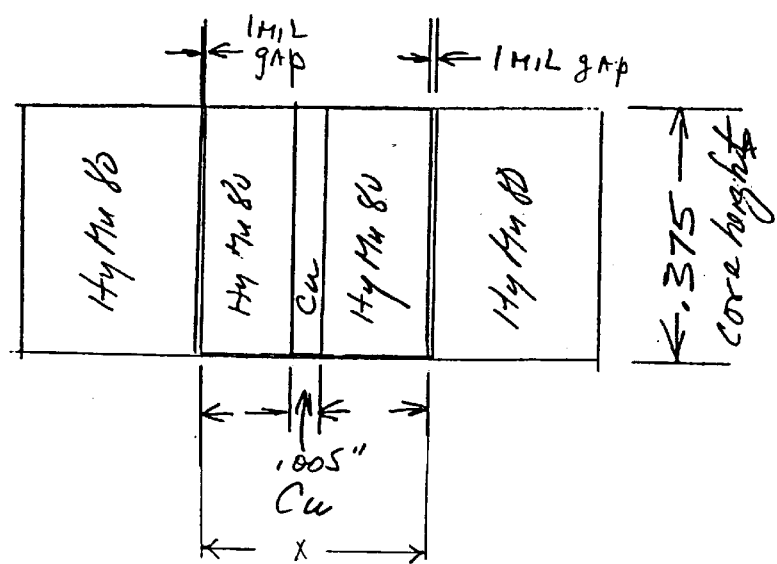

Turning now to FIGS. 5, 11, and 12, it will be appreciated that the known head spacing "x'" is preferably selected based on the peak profiles corresponding to known magnetic ink characters. Thus, the MICR character "zero" has four peaks and the nominal dimension between the first and fourth peaks are 0.091 inch and therefore one-half of that span corresponds to the spacing of 0.0455 inches. The copper cores are preferably laminated with commercially available 0.004 HyMu 80 stock.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for recognizing magnetic ink characters printed on a document, the method comprising the steps of:
    determining the peak information including positions and amplitudes for each character based on a first waveform generated in response to a magnetic field of each character;
    scaling the peak information to cause peak positions to correspond to known dimensions based on the first waveform and a second waveform, the second waveform generated in response to the magnetic field of each character; and,
    comparing the scaled peak information to peak profiles, the peak profiles corresponding to known magnetic ink characters.

2. The method of claim 1, wherein the first waveform is generated by a first read head and the second waveform is generated by a second read head, the method further including the steps of:
    determining a known head spacing, the known head spacing defining an actual distance between the first read head and the second read head;
    determining a measured head spacing based on the first waveform and the second waveform; and,
    calculating the scaled peak information based on the known head spacing and the measured head spacing.

3. The method of claim 2, further including the steps of:
    determining a number of samples between a common peak of the first waveform and the second waveform;
    determining a sample period for the samples; and,
    multiplying the number of samples between the common peak by the sample period for the samples.

4. The method of claim 3, further including the step of selecting the sample period based on a desired recognition resolution.

5. The method of claim 2, further including the steps of:
  determining a scaling factor based on the measured head spacing and the known head spacing; and,
  dividing the peak information by the scaling factor.

6. The method of claim 5, further including the step of dividing the measured head spacing by the known head spacing.

7. The method of claim 2, further including the step of selecting the known head spacing based on the peak differential profiles.

8. The method of claim 7, further including the step of selecting the known head spacing to be approximately 0.0455 inches.

9. The method of claim 1, further including the steps of:
  determining a number of samples between peaks of the first waveform;
  determining a sample period for the samples; and,
  multiplying the number of samples between peaks by the sample period for the samples.

10. A method for scaling peak information based on a scaling waveform, where the scaling waveform is generated by a scaling read head in response to a magnetic field of a magnetic ink character, the method comprising the steps of:
  determining a known head spacing, the known head spacing defining an actual distance between a measurement read head and the scaling read head, the measurement read head generating a measurement waveform in response to the magnetic field of the magnetic ink character;
  determining a measured head spacing based on the measurement waveform and the scaling waveform; and,
  calculating scaled peak information based on the known head spacing and the measured head spacing.

11. The method of claim 10, further including the steps of:
  determining a number of samples between a common peak of the measurement waveform and the scaling waveform;
  determining a sample period for the samples; and,
  multiplying the number of samples between the common peak by the sample period for the samples.

12. The method of claim 11, further including the step of selecting the sample period based on a desired recognition resolution.

13. The method of claim 10, further including the steps of:
  determining a scaling factor based on the measured head spacing and the known head spacing; and,
  dividing the peak information by the scaling factor.

14. The method of claim 13 further including the step of dividing the measured head spacing by the known head spacing.

15. The method of claim 10 further including the step of selecting the known head spacing based on the peak profiles.

16. The method of claim 15, further including the step of selecting the known head spacing to be approximately 0.0455 inches.

17. A read head assembly for a magnetic ink character recognition system, the read head assembly comprising:
  a first read head for generating a first waveform in response to a magnetic field of a magnetic ink character printed on a document; and,
  a second read head for generating a second waveform in response to the magnetic field of the magnetic ink character, said read heads having a known head spacing, the known head spacing defining an actual distance between the first read head and the second read head, said read heads being aligned to produce common peaks in the first and second waveforms.

18. The read head assembly of claim 17, further including a crosstalk circuit for reducing crosstalk between the first waveform and the second waveform.

19. The read head assembly of claim 17, wherein the known head spacing is selected based on peak profiles corresponding to known magnetic ink characters.

20. The read head assembly of claim 19, wherein the known head spacing is approximately 0.0455 inches.

21. A method for determining an actual head spacing between a first read head and a second read head of a magnetic ink character recognition (MICR) system, the method comprising the steps of:
  measuring a character width of a MICR character contained on a calibration document;
  determining a count ratio for the character based on a measurement waveform and a known waveform; and,
  calculating the actual head spacing based on the measured character width and the determined count ratio.

22. The method of claim 21, further including the steps of:
  determining a number of samples between a first peak and a last peak of a measurement waveform;
  determining a number of samples between a common peak of the measurement waveform and the known waveform; and,
  dividing the number of samples between the first peak and the second peak by the number of samples between the common peak.

23. The method of claim 21, further including the step of optically measuring the character width.

* * * * *